Figure 1:
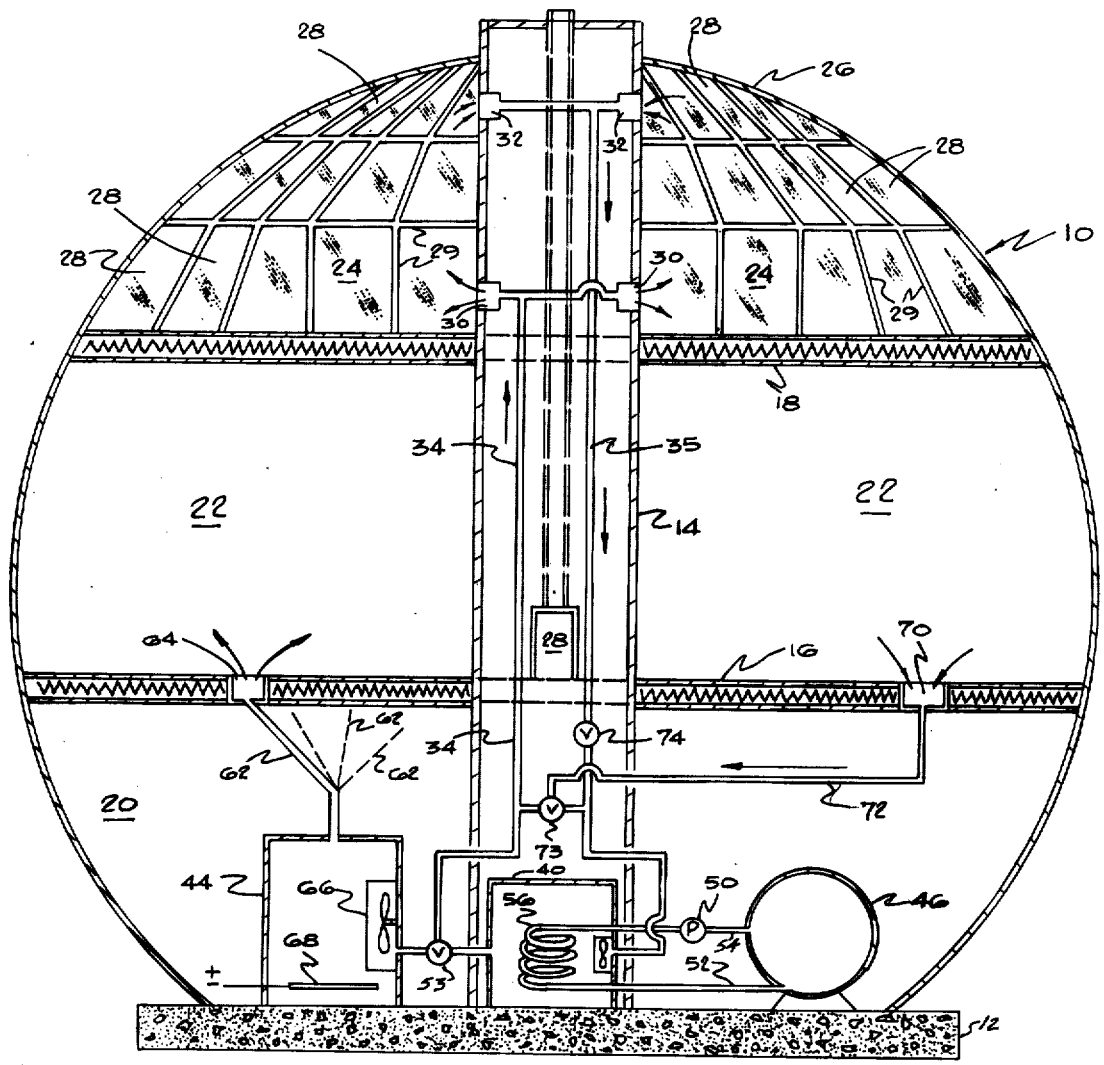

United States Patent [19]
Rugenstein

[11] 4,049,195
[45] Sept. 20, 1977

[54] SOLAR HEATED BUILDING STRUCTURE

[76] Inventor: Robert W. Rugenstein, Rte. 2, Box 251, Inman, S.C. 29349

[21] Appl. No.: 748,637

[22] Filed: Dec. 8, 1976

[51] Int. Cl.² .............................................. F24J 3/02
[52] U.S. Cl. .................................. 237/1 A; 126/270; 52/82
[58] Field of Search ............... 126/270, 271; 237/1 A, 237/46, 50; 52/80, 82

[56] References Cited

U.S. PATENT DOCUMENTS

| | | | |
|---|---|---|---|
| 2,213,894 | 9/1940 | Barry | 126/271 |
| 2,680,565 | 6/1954 | Löf | 126/271 |
| 3,841,302 | 10/1974 | Falbel | 126/271 |
| 3,902,474 | 9/1975 | Pyle | 237/1 A |
| 3,949,732 | 4/1976 | Reines | 237/1 A |
| 3,955,555 | 5/1976 | Bostrom | 126/270 |
| 4,020,989 | 5/1977 | Kautz | 237/1 A |

Primary Examiner—John J. Camby
Assistant Examiner—Henry C. Yuen
Attorney, Agent, or Firm—Luke J. Wilburn, Jr.; Wellington M. Manning, Jr.

[57] ABSTRACT

A solar-heated building structure comprising an exterior shell including a generally semi-spherical roof section comprising a plurality of light-transmitting panes of material providing a air and water-tight exterior surface therefor, horizontal floor means dividing the shell into a heat-insulated living compartment, and an attic compartment extending between the living compartment and the roof section to form a solar heat collector. Air in the attic compartment is heated by absorbed energy from sunlight passing through the light-transmitting panes of the roof section. Means are provided for circulating air into and out of the attic compartment to heat the same, and for circulating the thus heated air through the living compartment to maintain the living compartment at a desired temperature. Means are also provided in the shell for storing heat energy from the heated air for use to heat the living compartment when sunlight energy is unavailable.

17 Claims, 2 Drawing Figures

SOLAR HEATED BUILDING STRUCTURE

The present invention relates to a solar-heated building structure and, more particularly, to a building structure of unique construction containing a solar heat collection compartment which with associated conduits, and circulating and storage means, provides economical and effective heating and/or cooling of the building for year round comfort.

Because of the increasing expense and potential unavailability of fossil fuels, such as oil, gas, and other petroleum products, the sun is becoming an increasingly important source of energy for use by man. Major efforts, both in the national and private sectors, are being made to develop suitable equipment for effectively collecting and utilizing solar energy as a replacement for conventional fuels in energy applications, such as in the heating and cooling of residential homes, office buildings, and in industrial installations.

A major problem connected with the effective uses of solar energy by man resides in developing an economical and effective means for collecting, storing and subsequently utilizing the solar energy as needed. The total amount of solar energy, or radiation, which may be available to a solar collector unit is defined as "solar insolation" and comprises the total of the direct, diffuse, and reflected radiation available to the collector. Since direct radiation on a clear sunny day accounts for about 88 to 95% of the insolation, it is essential to maintain the sunlight-receiving surface of the solar collector normal to the direct rays of the sunlight for maximum efficiency of the collector. To accomplish this, active, or moving, solar collector units have been developed which operate to track the movement of the sun and/or condense the sun's rays into a single collection point. However, because of the complexity and expense involved in the construction and operation of such active solar collector systems, they are quite impractical for use in residential and small building heating and cooling systems. Therefore, in the solar heating and cooling of small building and residences, less expensive passive collector units, or panels, have been employed.

Typically, conventional passive, or non-moving, collector panels consist of an insulated box or housing having an outer cover plate of light-transmitting material, such as glass, reinforced plastic, or the like, and an interior compartment beneath the cover plate which contains heat absorbing elements, or plates, of dark, or black-painted materials, such as copper, steel, or aluminum. Air or liquid is passed through the interior compartment across the absorber plates and serves as a heat transfer medium which is distributed by suitable piping or ducting to the habitable areas of the building to be heated. To obtain maximum direct radiation from the sun, a number of these passive collector panels or boxes are positioned generally in the roof structure of the building and must be directly aligned with true south (in the Northern hemisphere). It is also desirable for maximum effectiveness of collection to maintain an angle of the plates, and thus the roofline of the building, such that the panels receive the direct rays of sunlight normal to their receiving surfaces at solar noon. However, because of building site restrictions and limitations, it is often not possible to provide a true south orientation of the collector panels in the building structure nor to obtain the optimum roofline angle. Because of the travel of the sun across the sky, even a true south-oriented solar collector panel receives sunlight radiation normal to its collector surface only for a very short period of the day, i.e., during solar noon. Thus, a large amount of morning and afternoon sunlight is not effectively received by the collector panels.

Although passive type solar collector panels are less expensive than the active, tracking type solar collectors, they also are considerably expensive to construct and to install in conventional roofing systems. The number, arrangement, and location of the absorber plates in the panels make the panels themselves quite expensive, and the necessary auxiliary conduits and piping required to transport the heat transfer medium to and from the individual panels and into the habitable portions of the building greatly add to the cost of the construction of the structure to be heated and/or cooled. Also, if liquid, such as water, is employed as the heat transfer medium, leaks can develop in the system and anti-freeze solutions must be employed to prevent freezing of the liquid in the collector during low temperature periods, such as at night, when sunlight is not available to heat the collector. If air is employed as the heat transfer medium, a major expense is involved in providing necessary ducting for transmission of the air to and from the individual collector units. One such solar-heated and cooled building structure employing collector panels is described in U.S. Pat. No. 2,680,565.

Thus, it can be seen that solar heating systems utilizing such passive collector panels are not only expensive in initial construction, but also effectively receive only a small part of the expected insolation due to the position of the sun in the early and late portions of the day.

It is therefore an object of the present invention to provide a building structure having improved passive solar collection means in the roof portion of the structure which overcomes, to a great extent, many of the aforementioned problems of the prior art.

It is a more specific object of the present invention to provide a building structure having improved solar collection means which effectively captures substantially all available solar insolation throughout most of the daylight hours of the day.

It is another specific object to provide a building structure having improved solar collection means which does not require a precise orientation of the building structure to locate the solar collection means on a directly south exposure.

It is another specific object to provide a building structure having improved solar collection means providing the roof component of the structure and wherein the heat transfer compartment of the solar collection means is of extremely large capacity to enable collection and storage of large volumes of heated air for use in the heating and/or cooling of the building.

It is another specific object to provide a building structure having an efficient and extremely economical solar heating and/or cooling system which eliminates a large portion of the heat exchange medium piping and ducting conduits employed in passive solar heat collector systems of the prior art.

It is a further object to provide a building structure having means for efficiently and economically collecting available sunlight energy, and for storing excess of such energy collected during peak periods for subsequent use when sunlight is not available for heating and/or cooling of the building.

It is still a further object of the invention to provide a building structure having solar heat-collecting capabilities in which collected energy may be readily utilized to provide potable hot water for domestic use, if desired.

In its broad aspects, the present invention comprises a unique solar-heated building structure comprising an exterior shell having a generally semi-spherical roof section which permits passage of sunlight into the shell, horizontal floor means within the shell dividing the interior of the shell into a living compartment and large attic compartment between the living compartment and roof section for storage of air heated by sunlight passing through the roof, and means extending through the floor means, and into and out of the attic compartment for the passage of heated air for heating and/or cooling of the living compartment of the building structure.

Figure 2:
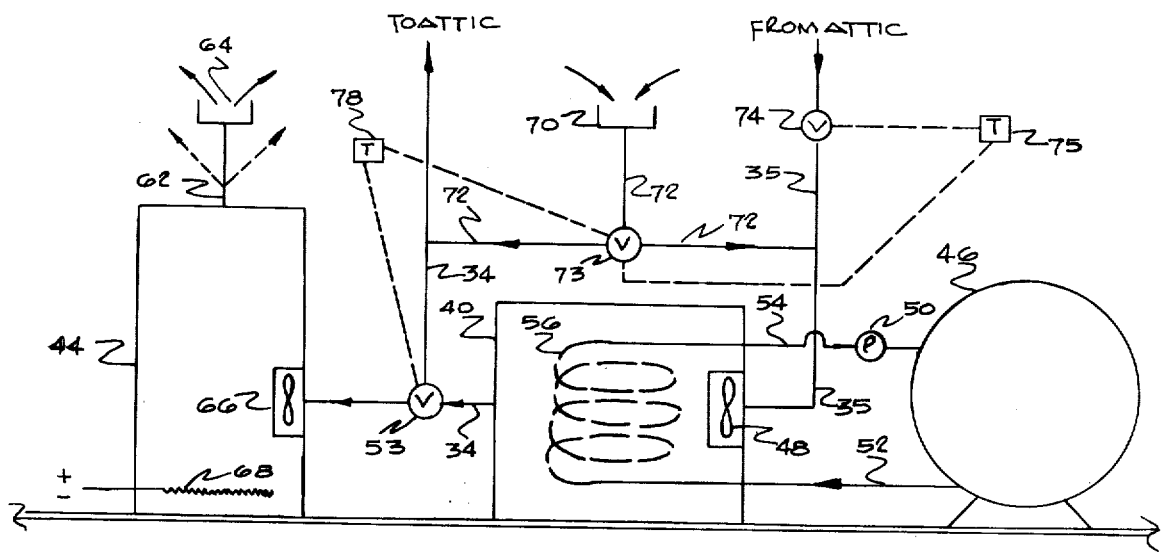

The above as well as other objects of the present invention will become more apparent, and the invention will be better understood, from the following detailed description of a preferred embodiment of the present invention, when read in connection with the accompanying drawings, in which:

FIG. 1 is a schematic sectional elevation view of a solar heated building structure embodying features of the present invention, and showing the arrangement and location of the principal components of the solar heating system of the structure; and FIG. 2 is a schematic diagram illustrating, in more detail, the interconnection of the components of the solar heating system of the building structure of FIG. 1.

Referring more specifically to the drawings, the solar heated building structure of the present invention, as seen in FIG. 1, comprises a generally spherical outer shell 10 supportably mounted on a building site by a suitable foundation or support base, such as a concrete slab 12, of requisite thickness. Supported on the foundation and extending vertically upwardly through the center of shell 10 is a hollow masonary column 14 which serves as a central support for the exterior walls of the shell and horizontal floors 16, 18 of the structure. Support column 14 also serves as a central passageway for air and/or liquids into and out of the attic solar heat compartment and to the heating and/or cooling system components of the building, as will be explained.

As shown, the spherical shell 10 of the building is divided by horizontal, heat-insulated floors 16 and 18 into a lower utilities level 20, central main living compartment 22, and an upper attic compartment 24 beneath the roof 26 of the shell. Central support column 14 may also serve as a passageway for a chimney flue from a conventional fireplace 28 located in the main living compartment 22 of the building.

As seen in FIG. 1, the roof section 26 of shell 10 is of generally semi-spherical shape and comprises a plurality of light-transmitting panes or sheets 28 which permit passage of sunlight into the attic compartment 24 of the shell. The individual light-transmitting panes 28 which form the outer semi-spherical roof section of the shell are preferably comprised of transparent sheets of material having excellent thermal insulation properties. Excellent results have been obtained in the use of HCH-76 glazing panes manufactured by HCH Associates, Inc. of Robbinsville, N. J. Such glazing panes are composed of rigid polyvinyl chloride sheets having wire mesh reinforcement embedded therein. Such panes have a thermal insulator K-factor of 1.3, or approximately 20 times greater than that of plain glass of equivalent thickness. The panes conveniently may be cut into the desired geometric shapes and supported in air-tight, sealed relationship by suitable metal or wooden framing 29 to form the semi-spherical roof section of the building shell 10.

The entire attic compartment 24 between the roof 26 and floor 18 thus serves as a large solar heat collector which receives sunlight passing through the semi-spherical roof section panes 28. To increase the heat-absorbing capability of the attic compartment, the surface of floor 18 as well as the exterior walls of the column 14 may be painted with black paint, or black polyethylene sheets may be placed throughout the floor of the attic compartment. The large volume of air contained in the attic compartment is thus heated to a high temperature by the transfer of the heat from the heat-absorbing surfaces of the floor 18 and column walls.

Extending through the wall of central column 14 adjacent floor 18 of the attic compartment are one or more openings 30 for the passage of air to be heated into the attic compartment, while one or more openings 32 in the wall of the column adjacent the upper roof of the attic provide for the passage of heated air out of the attic. Openings 30 and 32 respectively communicate, by way of suitable conduits, such as insulated ducts or pipes 34 and 35, with heat-distributing components in the lower utilities level 20 of the shell. Incoming cooler air passing through the openings 30 adjacent the floor of the attic rises as it is heated and passes out of the attic compartment through the openings 32 in the upper portion of the attic.

Located in the lower utilities level 20 of the building shell are means for collecting solar heat energy and circulating heated air throughout the living compartment of the shell. As shown, the principal components in the lower level comprise a heat exchange unit 40, a furnace 44, and one or more hot water storage tanks 46. As illustrated schematically in FIG. 2, the air inlet and outlet sides of the heat exchange unit 40 are connected, respectively, to air ducts 35 and 34 which extend upwardly through the central column of the shell and communicate with the interior of the attic solar heating compartment, as previously described. Fan means 48 provided adjacent the air inlet side of heat exchange unit 40 circulates heated air from the attic heating compartment through the exchanger and back into the lower portion of the attic. Water from water storage tank 46 is continuously or intermittently circulated by pump 50 and conduits 52 and 54 through a water coil 56 of the exchanger 40 for heating the water in the storage tank. This heated water thus serves to store solar heat energy for subsequent use in heating of the living compartment of the building when sunlight is not available for directly heating the air, as will be explained hereinafter.

The air outlet side of the heat exchange unit is alternatively connected by a two-position, thermostatically controlled valve 53 and conduit to the interior of the furnace 44, which is provided with a fan 66 to supply heated air by suitable outlet air ducts 62 to heat registers, one of which, 64, is shown, located in the various rooms of the living compartment of the shell. Thus furnace 44, fan 66, and air ducts 62 serve as air distribution means to direct heated air from the heat exchanger 40 into the living compartment of the shell. Furnace 44 is also provided with heating means, such as an electrical coil 68, which may be utilized as an auxiliary source of energy to heat the living compartment of the shell when sufficient solar heat energy is not available for this purpose. To return air from the living compartment to the heat exchanger or to the attic compartment for reheating, an air return outlet 70 in the living compartment is connected by a suitable air return conduit 72, and a thermostatically controlled, three-position valve 73, which is operable to selectively direct return air from the living compartment to the heat exchanger (by way of conduit 35) or to the attic by way of return duct 34. The position of valve 73 is controlled by thermostats located in the attic compartment and living compartment, as will be explained. Air duct 35 from the attic compartment is also provided with a thermostatically controlled valve 74 and its operation will be hereinafter described.

As best illustrated by the schematic diagram of FIG. 2, the heat distribution system of the solar heated building structure is provided with several modes of operation, depending upon the available solar energy for heating and the heating requirements of the living compartment of the building shell. In a first mode of operation, when the temperature of the air in the attic solar heat compartment rises above a preselected value, e.g., 80° F., and heated air is not required to heat the living compartment 22, air control valve 74 is automatically opened and valve 73 closed by means of a thermostat 75 in the attic, and heated air from the upper portion of the attic compartment is continuously drawn through conduit 35 into the inlet side of the heat exchanger 40 by fan 48. Water circulating through the coils of the heat exchanger from water storage tank 46 is thus heated by the air and stored in the tank for use to heat the living compartment during periods when sufficient sunlight is not available for this purpose, as will be explained. Air leaving the air outlet side of heat exchanger 40 passes by way of air valve 53 directly through duct 34 back into the attic compartment for reheating.

In a second mode of operation, whenever the temperature in the living compartment drops below a desired level, e.g., 72°F., two-position valve 53, which is controlled by a thermostat 78 in the living compartment, is automatically positioned to direct all air leaving the exit side of heat exchanger 40 into furnace 44, where it is directed by furnace fan 66 through ducts 62 and registers 64 to heat the living compartment of the shell. Correspondingly, valve 73 is automatically positioned to communicate return outlet 70 with attic return duct 34, and return air from the living compartment passes by outlet 70, conduit 72, valve 73, and duct 34 back into the lower area of the attic for reheating.

In a third mode of operation, when the temperature in the attic solar heat compartment falls below a desired level, e.g., 80° F., and is thus ineffective for heating the living compartment of the shell, thermostatically controlled valve 74 is automatically closed and valve 73 positioned to communicate air return outlet 70 with heat exchanger 40 so that return air from the living compartment is passed directly back into the heat exchanger 40 by way of return conduit 72, valve 73, and duct 35 where it is reheated by the circulation of hot water from hot water storage tank 46 and returned to the living compartment by way of furnace 44.

In a fourth mode of operation, when heat is unavailable both from the attic solar heat compartment and the hot water supply tank to heat the living area, auxiliary heat coil 68 in furnace 44 is energized and air is continuously circulated through the living compartment by ducting 62, and returned to the furnace for reheating by way of outlet 70, air return conduit 72, valve 73, duct 34, heat exchanger 40, and valve 53.

If desired, auxiliary equipment, such as a clothes dryer, may be connected into the heating system and hot air supplied for drying clothes by way of a conduit line and a manually operated valve and conduit connecting the dryer to the heat exchanger 40.

Although two thermostats and three thermostatically controlled valves have been shown to illustrate one manner for directing heated air in the various modes of operation of the heating system, it is obvious that the number of valves employed and their specific locations in the air flow lines may vary, depending on the capability and type of valves utilized.

If it is desired to employ the solar heat energy collected in the attic solar collector compartment for cooling the living compartment of the shell, a suitable air conditioning unit would be provided in the utilities level of the shell and connected in suitable manner to receive heat energy from thhe hot water from heat exchanger 40 to operate the air conditioning unit, and the manner of connection of the air conditioning unit thereto is believed to be well within the skill of those familiar with the art.

If additional heat energy is required above that which may be provided by the heated air system described, a series of water pipes may be provided on the floor of the attic compartment, and heated water from this system could be similarly conveyed through the central column of the shell to the heat exchanger and air conditioning unit in a manner obvious to one skilled in the art.

Since it is unnecessary to provide an anti-freeze solution in the water in storage tank 46 to prevent it from freezing, the hot water in the storage tank may be employed directly for household and domestic use. Suitable piping, not shown, may be connected to the hot water storage tank and directed to faucet outlets in the living compartment of the building for this purpose.

Although, in the preferred embodiment of the invention described herein, the semi-spherical roof section of the building shell has been shown and described as being comprised of light-transmitting panes substantially throughout the total surface area of the semi-spherical roof section, it should be understood that the panes may be employed over less than the total surface area, so long as sufficient heat is generated in the attic compartment to provide the requirements for the building. Thus, for example, in northern climes of the northern hemisphere, a portion of the northernmost exposure of the roof section of the building structure may well be composed of conventional roofing materials, provided that the heat absorbing surfaces of the attic compartment are not blocked from contact by the sunlight rays to prevent optimum efficiency of the solar collector.

From the foregoing detailed description of preferred embodiments of the present invention, it can be seen that the solar heated building structure may be effectively utilized to provide for heating and/or cooling of the living compartment of the building, as well as to provide auxiliary heat energy for operating ancilliary equipment, such as clothes dryers, provide hot water for domestic use, and the like. Because of the unique arrangement and construction of the panels of light transmitting material and the semi-spherical shape of the solar collector in the attic portion of the building, direct rays of sunlight can be received directly into the attic solar collector throughout the major portion of the day, regardless of the position of the sun in its path across the sky.

That which is claimed is:

1. A solar-heated building structure comprising an exterior shell including a generally semi-spherical roof section, said roof section having exterior light-transmitting surface means for admitting passage of sunlight into said shell, horizontal floor means within said shell dividing the interior of the shell into a living compartment and an attic compartment extending between said living compartment and said roof section for the storage of air to be heated by sunlight passing through said exterior surface means of said roof section, conduit means extending through said floor means and into said attic compartment for the passage of air into said attic compartment to be heated therein and for the passage of heated air out of said attic compartment, and means in said shell communicating with said conduit means for circulating the heated air through said living compartment and for returning air from said living compartment to said conduit means for reintroduction into said attic compartment to be heated therein.

2. A structure as defined in claim 1 wherein said building structure further includes a support base for said shell, a central support column for said shell mounted on said base and extending vertically through said shell to said semi-spherical roof section, said column having a central passageway therethrough; and said conduit means comprising a first conduit extending through said column passageway from adjacent said support base and having outlet means communicating with the lower portion of said attic conmpartment adjacent said horizontal floor means for introducing air into said attic compartment for being heated therein, and a second conduit extending through said column passageway from adjacent said support base and having inlet means communicating with the upper position of said attic compartment adjacent said roof section for removal of heated air therefrom.

3. A structure as defined in claim 2 wherein said means for circulating heated air through said living compartment includes means positioned below said living compartment in said shell communicating with said first and second conduits for circulating heated air from said second conduit into said living compartment and for removing air from said living compartment and returning it to said attic compartment by way of said first conduit.

4. A building structure as defined in claim 2 wherein said air circulating means includes a heat exchanger communicating with said first and second conduits, fan means associated with said heat exchanger for directing heated air from said second conduit and attic compartment through said heat exchanger and into said first conduit for recirculation to said attic compartment, means for circulating a liquid through said heat exchanger in heat exchange relationship with air passing therethrough to heat the liquid, and storage means for collecting the heated liquid from said heat exchanger.

5. A structure as defined in claim 4 wherein said air circulating means includes first air distribution means operatively connected to said heat exchanger for receiving heated air therefrom and for directing the heated air into said living compartment.

6. A structure as defined in claim 5 wherein said first air distribution means comprises furnace means having a heated air inlet operatively connected to said heat exchanger, air duct means connecting said furnace means with said living compartment for distribution of air thereinto, and fan means for directing heated air from said furnace means through said air duct means into said living compartment.

7. A structure as defined in claim 6 wherein said air circulating means further includes second air distribution means for selectively connecting said living compartment to said first conduit or to said heat exchanger to direct air from said living compartment into said attic compartment or into said heat exchanger for being heated thereby.

8. A structure as defined in claim 7 wherein said air circulating means includes thermostatically controlled valve means in said second conduit and said second air distribution means for closing said second conduit and for directing air from said living compartment into said heat exchanger for being heated by heated liquid in said liquid storage means when the temperature in said attic compartment falls below a predetermined level.

9. A structure as defined in claim 7 wherein said air circulating means include thermostatically controlled valve means therein for directing heated air from said attic compartment through said heat exchanger and back to said attic compartment when the temperature in said attic compartment is above a preselected temperature.

10. A structure as defined in claim 9 wherein said thermostatically controlled valve means includes means for directing said heated air from said heat exchanger back to said attic compartment by way of said living compartment when the temperature in said living compartment falls below a predetermined level.

11. A structure as defined in claim 1 wherein said roof section exterior surface means comprises a plurality of light transmitting panes of material, and support means for mounting said panes in juxtaposed water and air-tight relationship to form said semi-spherical roof section.

12. A structure as defined in claim 11 wherein said panes comprise polyvinyl chloride sheets having a relatively high thermal insulation factor.

13. A structure as defined in claim 12 wherein said sheets have a thermal insulation factor of approximately 20 times greater than plain glass of equivalent thickness.

14. A structure as defined in claim 1 wherein said floor means defining the floor of said attic compartment are comprised of a dark, heat-absorbing surface.

15. A structure as defined in claim 14 including a support base for said shell, a central support column for said shell mounted on said base and extending vertically through said shell, and said semi-spherical roof section is supportably attached to said support column for central support thereby.

16. A structure as defined in claim 15 wherein said shell is of substantially spherical shape, and wherein said floor means and said shell are centrally supported by said support column.

17. A solar-heated building structure as defined in claim 1 wherein said exterior surface means of said roof section comprise a plurality of panes of substantially sheet-like material, and means rigid, light-transmitting supporting said panes in juxtaposed water and air-tight relation to form substantially the entire surface are of said semi-spherical roof section.

* * * * *